United States Patent [19]
Bergsman et al.

[11] Patent Number: 5,247,568
[45] Date of Patent: * Sep. 21, 1993

[54] METHOD FOR CREATING AND COMPOSING AUDIO TEXT MESSAGE

[75] Inventors: Barry Bergsman, Los Angeles; Curtis Pearlman, Woodland Hills, both of Calif.

[73] Assignee: Intertel Entertainment, Inc., Los Angeles, Calif.

[*] Notice: The portion of the term of this patent subsequent to Sep. 8, 2009 has been disclaimed.

[21] Appl. No.: 899,780

[22] Filed: Jun. 17, 1992

Related U.S. Application Data

[63] Continuation of Ser. No. 544,390, Jun. 26, 1990.

[51] Int. Cl.$^5$ .................. H04M 1/64; H04M 11/00
[52] U.S. Cl. ................................ 379/67; 379/88; 379/89
[58] Field of Search .................. 379/67, 88, 89

[56] References Cited

U.S. PATENT DOCUMENTS

| | | | |
|---|---|---|---|
| 4,427,848 | 1/1984 | Tsakanikas | 379/88 |
| 4,649,563 | 3/1987 | Riskin | 379/97 |
| 4,677,659 | 6/1987 | Dargar | 379/97 |
| 5,146,487 | 9/1992 | Bergsman et al. | 379/67 |

*Primary Examiner*—James L. Dwyer
*Assistant Examiner*—F. Tsang
*Attorney, Agent, or Firm*—Blakely, Sokoloff, Taylor & Zafman

[57] ABSTRACT

A method employed in conjunction with an audio text or interactive voice mail system which enables a caller utilizing a telephone system to direct the system to deliver a message to a particular person at a specified phone number, date and time. The caller may select a particular message from a list of messages which is to be delivered and may record a personal message for incorporation into the selected message or to be added to the selected message. The name of a person who is to receive the call can be uniquely identified. Prompting for the recipient's telephone number and the date and time at which the message should be delivered, and composing the actual message in preparation for its delivery is also performed.

4 Claims, 2 Drawing Sheets

METHOD FOR CREATING AND COMPOSING AUDIO TEXT MESSAGE

This is a continuation of application Ser. No. 07/544,390 filed Jun. 26, 1990.

SUMMARY OF THE INVENTION

The present invention is a method employed in conjunction with an audio text or interactive voice mail system. An audio text system according to the present invention allows a caller utilizing a telephone system to direct the system to deliver a message to a particular person at a specified phone number, date and time. The caller may select a particular message from a list of messages which is to be delivered and may record a personal message for incorporation into the selected message or to be added to the selected message.

The present invention is specifically directed to a process for identifying the name of a person who is to receive the call, prompting for the recipient's telephone number and the date and time at which the message should be delivered, and composing the actual message in preparation for its delivery.

DETAILED DESCRIPTION OF THE INVENTION

Figure 1:
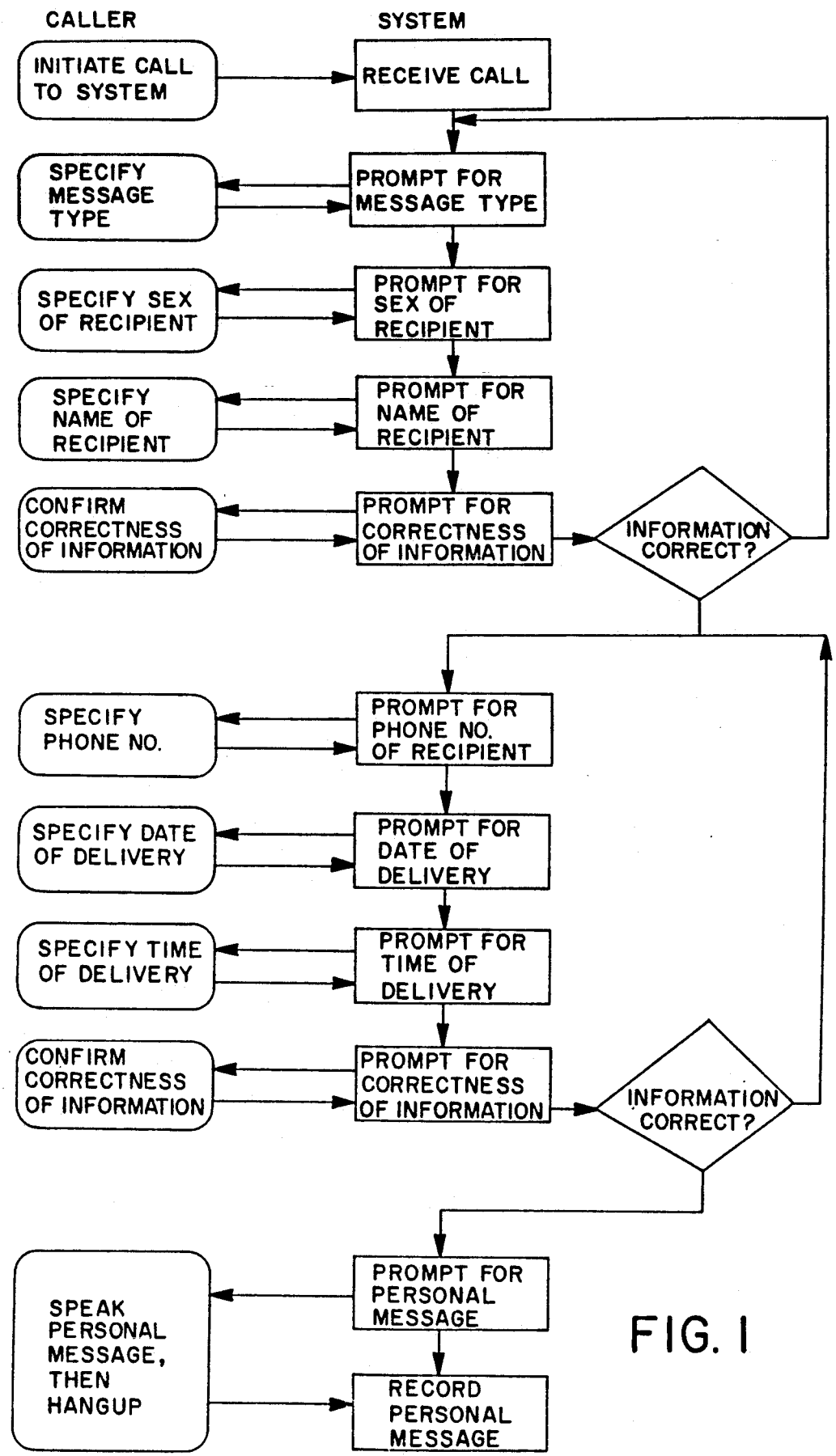
FIG. 1 is a flow diagram showing the steps performed to obtain information from a caller for a message to be subsequently delivered.
Figure 2:
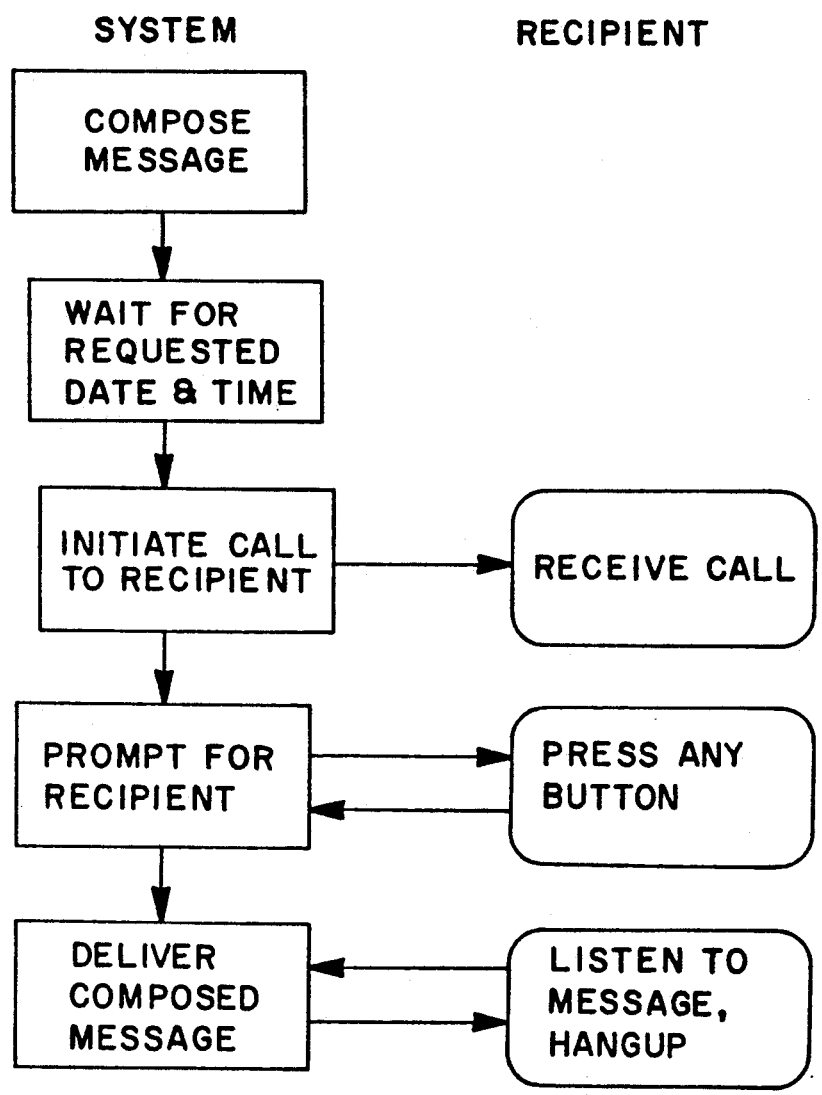
FIG. 2 is a flow diagram showing the steps performed to place a call to a previously identified recipient and deliver a previously composed message.

A description of the invention is provided by way of the following example and with reference to FIGS. 1 and 2.

Referring first to FIG. 1, after a caller has dialed into the system and has confirmed that he has the touch-tone phone, he is prompted for the type of message to be delivered. (The present invention is not intended for use with rotary dial phones since such phones are not capable of generating tones for each of the different digits (0-9) which may be entered when using a telephone.) For example, if a birthday message is desired, the caller would be instructed to press 1, if an anniversary message is desired, the caller would be instructed to press 2, if a congratulations message is desired, the caller would be instructed to press 3, and if a get well message is desired, the caller would be instructed to press 4. Once the type of message had been selected, the caller would then be prompted to determine if the recipient of the call is a male in which case the caller would be instructed to press 1 or if the recipient of the call is a female, the caller would be instructed to press 2. If desired, after pressing 1 or 2, the caller can be prompted to confirm the correctness of the entered message type and gender, and be given an opportunity to make corrections.

It should be recognized however that identifying the recipient as male or female may not be necessary depending upon the type of message to be delivered, although such information could be utilized during the name selection processing which is described below.

The caller is then instructed to select the name of the recipient to allow the system to incorporate the recipient's name in the delivered message. While it would be possible for the caller to speak the recipient's name after being prompted to do so, by allowing the system to determine the recipient's name, the delivered message can integrate the recipient's name in the message using the same voice as is used for the entire message. This allows for a more professional sounding message than would be the case if the caller's voice pronouncing the recipient's name was to be integrated into the delivered message.

While there are a variety of ways in which the recipient's name can be identified, it is desirable to enable the name to be selected utilizing the least number of telephone key pad entries and the shortest list of names from which the correct name is to be chosen by the caller. More particularly, inasmuch as there are only 10 keys for entering data using a touch tone telephone, (or 12, counting the star (*) key and the pound (#) key), the 26 letters which may form the recipient's name cannot simply be spelled by pressing the telephone key pad. Furthermore, even if it were possible to spell the recipient's name using the telephone key pad, in order for the recipient's name to be pronounced in a natural sounding voice, it is necessary to prerecord all names which are likely to be requested. In this connection, while it may not be possible to record every possible name for selection, it has been determined that there are approximately 1,200 first names which are likely to be encountered in the United States. Of course, the same methodology as described below may be applied to identify names which are likely to be encountered in other countries.

in this connection, according to the present invention, each name which is likely to be encountered is recorded in a file which is pointed to by a code determined by entries on a telephone key pad. However, it should be understood that since not all names can be uniquely identified (without pressing an unacceptably large number of keys to obtain a unique identification), the aforesaid code may point to a list of possible names which have been previously recorded.

For example, the caller could be prompted to press the key having the first letter of the first name (using, for example, the 1 key for the letters Q or Z which do not appear on a telephone keypad). This entry could then be followed by a prompt requesting that the caller identify which of the 3 possible (or in the case of the 1 key, two possible) letters is the first letter of the person's name. For example, if the caller had pressed the 2 key which contains the letters A, B and C, the following prompt could request the caller to enter a 1 if the recipient's first name begins with an A, a 2 if the recipient's first name begins with a B or a 3 if the recipient's first name begins with a C. Once this prompt has been responded to, the system will have been provided with the first letter of the recipient's name and whether the recipient is a male or female. With this information, the caller could then be presented with a spoken list of names beginning with the selected letter for the selected sex and instructed to press a key after the recipient's correct name was announced. If all names in the list are announced and the caller has not selected any, the caller could then be given a choice of hearing the list again or recording the recipient's name in the caller's own voice if the recipient's name could not be located among the names announced.

While such a system could work and would require depressing only 2 keys to select the person's name followed by a third key once the name was announced, it has been determined that for certain letters, the list of possible names beginning with a particular letter would be in excess of 12 which could be frustrating and confusing to a caller having to listen to and select from a list containing so many names.

The foregoing system could be improved by having the caller select the first two letters of the recipient's name which would require depressing four keys plus one additional key when the recipient's name is announced. While this would reduce the length of the possible names list, for certain letter pairs, the list would still be relatively long.

It has been determined that a particularly advantageous technique for selecting the recipient's name is to press the keys representing the first four letters of the person's name, but without specifying which of the three possible letters represented by each key, such that, for example, the name "Beth" would be represented by the digits 2-3-8-4 and the name "Candy" would be represented by the letters 2-2-6-3. Using this technique, it has been determined that even though any four digits represent numerous letter combination, approximately 50% of first names likely to be encountered in the United States can be uniquely identified by the four digit combination. With respect to the approximately 50% of first names which cannot be uniquely identified by the four digit combination, most require that the spoken list of names referenced above include only two names. Further, the worse case, i.e., the case having the longest list of spoken names to choose from, includes only twelve names.

in this manner, a highly efficient and acceptable trade off is made between the number of keys which need to be depressed to select a name and the number of possible names resulting from the selection.

Once the name has been selected, a further prompt is provided informing the caller of the type of message requested to be delivered, the name of the recipient and if entered, the sex of the recipient. As previously noted, a prompt allowing the caller to correct mistakes can be made after only part of the information has been entered, such as message type and gender. Of course if implemented with prompts seeking confirmation of portions of the input, later prompts would not need to request repeat confirmation. On the other hand, such repeat confirmation prompts can be included, if desired.

If the information is not correct, the caller is given an opportunity to make corrections. If the information, is correct, the caller is then prompted to enter the phone number, including the area code, where the call is to be placed. If the area code is split across two time zones, a further prompt is added to identify the time zone where the call is to be delivered. Once this information has been entered, the caller is prompted for the 1 or 2 digits of the month and the 1 or 2 digits date of the date that the call is to be placed. If the entered month and date is earlier than the current date, it could be assumed that the message is to be delivered the following year.

After the date information has been entered, the caller is prompted for the time followed by, for example, A i.e., the 2 key for a.m. or P i.e., the 7 key for p.m. Once this information has been entered, the system informs the caller of the phone number, the date and the time which have been specified and requests the caller to confirm that the information is correct and gives the caller an opportunity to correct any of the entered information.

Once the entered information has been confirmed as being correct, the caller is prompted to leave a personal message to be added to the selected message.

After the personal message, if any, has been recorded and the caller has completed the call, the information which has been obtained, i.e., the type of message to be delivered, the date and time the call is to be placed, the recipient's sex, if requested, a pointer to the recipient's recorded name, and a pointer to the personal message, if any, is stored in a database for subsequent delivery. Details concerning the database and message delivery system are not needed for an understanding of the invention and such details are known to persons skilled in the art. For example, a suitable database and message delivery system which may be used to implement the invention is available from Sprint Gateways of Overland Park, Kansas.

Details concerning the manner in which a complete message which is to be delivered is composed are as follows.

First, the components of the composed message are as follows:

1) A prompt identifying the recipient by name for the purpose of requesting that the recipient be placed on the line in the event the recipient did not answer the phone. For example, a suitable prompt might be presented as follows:

Hello, this is a call for (name of recipient). Please press any button when (he or she) is on the phone.

2) The actual message type which the caller selected. For example, if the caller selected a birthday message, the following message might be delivered after a key had been pressed in response to the prompt specified in 1 above:

Hello (name of recipient). I hear it's your birthday. So I had to call and say (singing) Happy birthday to you. Happy birthday to you Happy birthday dear (name of recipient) Happy birthday to you 3) Once the message is delivered, if the caller included a personal message, the personal message would be delivered after a suitable introduction had been stated, such as:

A very special person asked me to pass on the following message (caller's personal message).

Further details concerning the message composition process are as follows.

After the caller hangs up, a record is created with all of the entered information and stored in a database until the requested date and time has been reached. At the requested date and time, the stored record is retrieved and the actual message which is to be delivered is made ready for delivery. For example, if the message type is 1 indicating a birthday greeting, a file containing the birthday greeting is combined with a file containing the prerecorded names to create the birthday greeting with the recipients name embedded within the message. Similarly, if the caller left a personal message, that personal message would be combined with the suitable introduction as described above.

Referring now to FIG. 2, when the system determines that the caller's requested date and time for delivery of the message have arrived, the system initiates a call to the phone number specified by the caller. When the phone is answered, the person answering the phone is advised that this is a call for the recipient whose name was specified by the caller and is prompted to press any key once the recipient has picked up the phone. Once it has been determined that the recipient is on the line, the composed message is delivered.

We claim:

1. A method for determining a name of a person who is to receive an audio text message which is to be subsequently delivered utilizing a touch tone telephone system comprising the steps of:
   a) prompting a caller to press a predetermined number of touch tone keys wherein said predetermined number of keys correspond to the first said predetermined number of letters of said person's name;
   b) generating a number representing the predetermined number of keys pressed by the caller;
   c) using said number to access a list containing a prerecorded voice for each of at least one name which corresponds to said number;
   d) prompting the caller to press a key after the desired name in pronounced during the next step;
   e) playing said prerecorded voice to the caller beginning with the first name in said list until the caller has pressed a key or all names in the list have been played;
   f) generating and storing a second number representing the name which immediately preceded the caller's key press responsive to the prompt of step d), or, if there was no key press, a second number representing the fact that no key was pressed responsive to the prompt of step d).

2. The method deferred by claim 1, wherein said predetermined number is at least 3.

3. The method deferred by claim 1 wherein said predetermined number is at least 4.

4. The method deferred by claim 1 wherein said predetermined number is at least 5.

* * * * *